United States Patent [19]
Miller

[11] Patent Number: 5,805,256
[45] Date of Patent: Sep. 8, 1998

[54] REMOTE CONTROL WITH A THUMBSWITCH FOR CONTROLLING EQUIPMENT THAT HANDLES VIDEO OR AUDIO SIGNALS

[76] Inventor: William Miller, 30 Troy Rd., Whippany, N.J. 07981

[21] Appl. No.: 394,883

[22] Filed: Feb. 27, 1995

[51] Int. Cl.⁶ .................................................. H04N 5/44
[52] U.S. Cl. .................. 348/734; 455/151.2; 345/161; 273/438; 341/22
[58] Field of Search ........................... 348/734; 359/142, 359/146; D14/218; 340/825.69, 825.72; 381/105; 455/151.4, 151.1, 151.2, 352; 341/176, 20, 22; 446/456; 273/148 B, 438, 85 G; 345/157, 158, 161, 184; 434/45; 200/505, 525, 61.85; H04N 5/44

[56] References Cited

U.S. PATENT DOCUMENTS

| | | | |
|---|---|---|---|
| D. 270,631 | 9/1983 | Moskin et al. ............................. | D13/38 |
| D. 298,749 | 11/1988 | Yant ........................................ | D14/114 |
| D. 300,023 | 2/1989 | DeRamus, Jr. ............................ | D13/32 |
| D. 318,496 | 7/1991 | Tse ........................................... | D21/48 |
| D. 319,059 | 8/1991 | Divine ...................................... | D14/168 |
| D. 322,609 | 12/1991 | Patton ....................................... | D14/217 |
| D. 327,674 | 7/1992 | Kuo .......................................... | D14/114 |
| D. 327,882 | 7/1992 | George et al. ........................... | D14/115 |
| D. 330,020 | 10/1992 | Jung ......................................... | D14/114 |
| D. 340,042 | 10/1993 | Copper et al. ........................... | D14/114 |
| D. 340,706 | 10/1993 | Hu ............................................ | D14/114 |
| D. 347,028 | 5/1994 | Galden ..................................... | D21/48 |
| D. 349,491 | 8/1994 | Copper et al. ........................... | D14/114 |
| 4,020,527 | 5/1977 | O'Neill .................................... | 16/110 R |
| 4,178,547 | 12/1979 | Santana ................................... | 455/151.1 |
| 4,414,438 | 11/1983 | Maier et al. ............................. | 345/161 |
| 4,864,340 | 9/1989 | Kaneko .................................... | 354/266 |
| 5,012,520 | 4/1991 | Steeger ..................................... | 381/68 |
| 5,030,955 | 7/1991 | Durst et al. ............................. | 341/176 |
| 5,181,024 | 1/1993 | Tsunoda et al. ..................... | 340/285.69 |
| 5,253,068 | 10/1993 | Crook et al. ............................ | 348/734 |
| 5,267,181 | 11/1993 | George ................................ | 364/709.12 |
| 5,359,367 | 10/1994 | Stomhill .................................. | 348/731 |
| 5,432,510 | 7/1995 | Matthews ................................. | 341/20 |
| 5,479,163 | 12/1995 | Samulewice .............................. | 341/20 |
| 5,512,892 | 4/1996 | Corballis et al. ........................ | 341/20 |
| 5,539,478 | 7/1996 | Bertram et al. ......................... | 348/734 |

*Primary Examiner*—John K. Peng
*Assistant Examiner*—Jeffrey S. Murrell
*Attorney, Agent, or Firm*—Friedman Siegelbaum LLP

[57] ABSTRACT

A remote control can signal equipment that handles a video or audio signal, such as a television. The remote control has a bar with a central longitudinal axis. The bar has a head and is sized to be manually gripped. A thumbswitch mounted at the head of the bar, is approximately aligned with the central longitudinal axis. Also, a signalling device is mounted on the bar for radiating a control signal to the equipment. A processor is coupled to the thumbswitch and the signalling device for commanding through the signalling device in response to a predetermined reciprocation of the thumbswitch an operational change in the equipment, which is unambiguously consummated without further manipulation of the remote control and independently of angular displacement of said central longitudinal axis. For example, the processor can signal the equipment to change channels in response to operation of the thumbswitch.

24 Claims, 4 Drawing Sheets

FIG. 4
FIG. 5
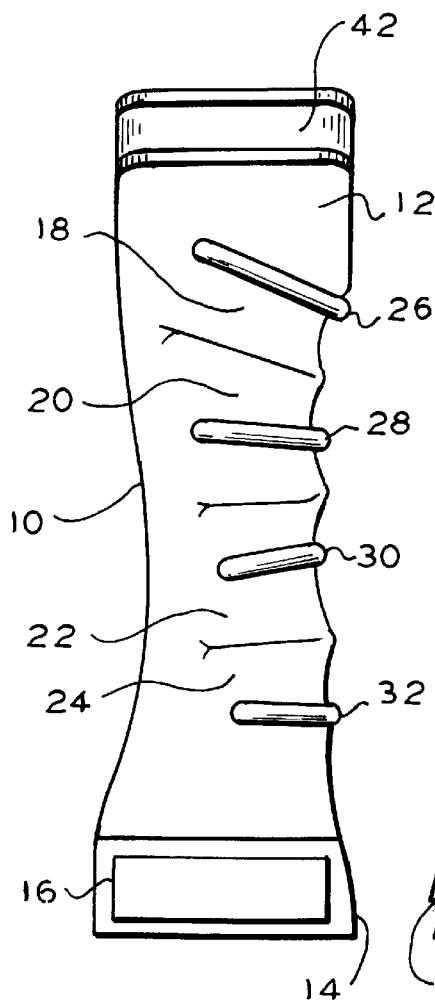
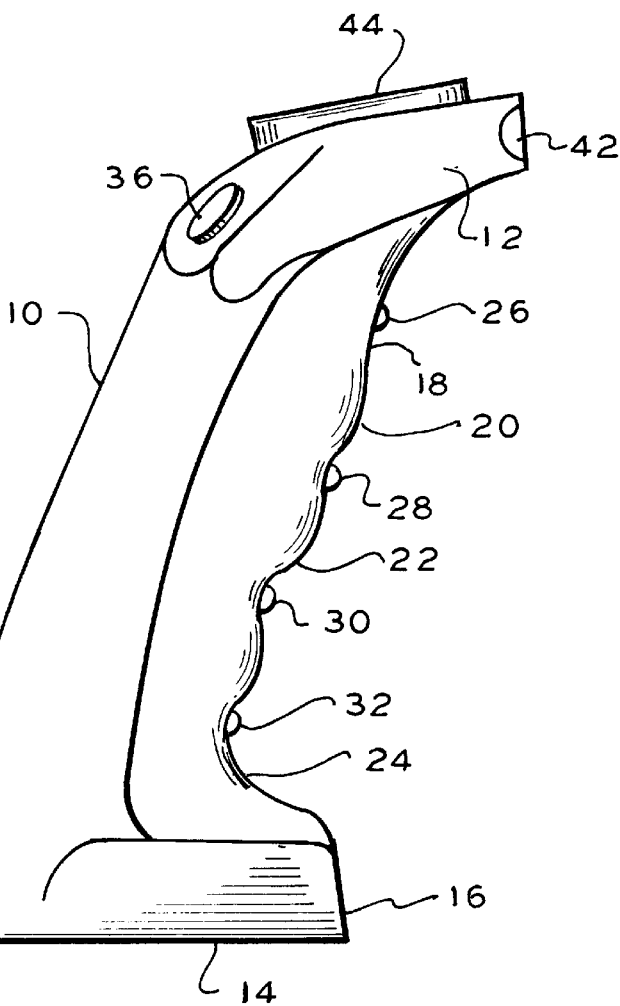
FIG. 7
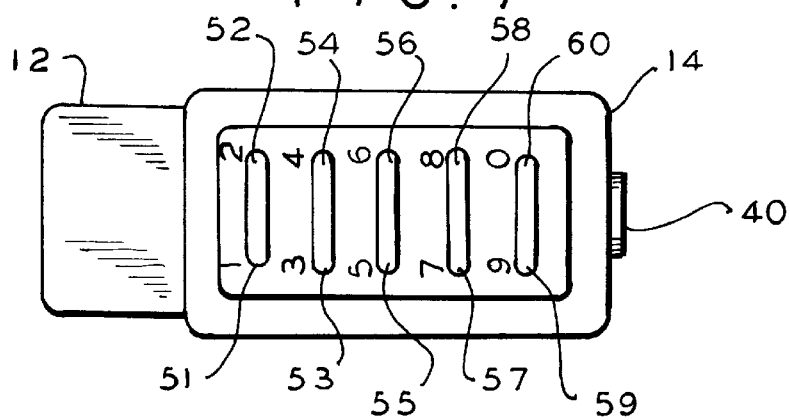

REMOTE CONTROL WITH A THUMBSWITCH FOR CONTROLLING EQUIPMENT THAT HANDLES VIDEO OR AUDIO SIGNALS

BACKGROUND OF THE INVENTION

1. Field of the Invention

The present invention relates to remote controls for various equipment that handle a video or audio signal.

2. Description of Related Art

Known remote controls for televisions and other equipment have typically been housed in a thin rectangular slab with an infrared transmitter at one end of the case. One face of the control includes a number of control buttons, forming a keypad and giving the general appearance of a calculator. A disadvantage with this known remote control is that single-handed operation is difficult. To operate various keys on one face of the case with a thumb, the other four fingers must perform the difficult task of stretching across and gripping the opposite face.

Such finger placement is difficult with a rectangular case of conventional shape and size. For convenience therefore, the remote control is typically supported in one hand, while the other hand is used to depress the various keys on the remote control.

U.S. Pat. No. 5,267,181 shows a device with a chord keyboard. The device can communicate with or without wire to control telephones, televisions, and stereos. A disadvantage with this unit is that it does not provide a thumbswitch that can be reciprocated to consummate an operational change in the controlled unit. Instead, the illustrated thumbswitches are shift keys, function keys, and similar qualifying keys that must be manipulated in conjunction with other keys (or transducers) to consummate a command.

U.S. Pat. No. 5,253,068 shows a gun-shaped remote control for a television or video cassette recorder. The control uses infrared emitters to change channels and perform other standard control functions. A trigger is used to change channels but other buttons are located on the side and back of the gun to operate other control options. This device does not optimize the placement of control push buttons and the thumb cannot rest atop the control in a natural position to operate important functions. Other remote controls are shown in U.S. Pat. Nos. 5,012,520 and 5,181,024.

Numerous designs exist for joysticks having an ergonomically shaped handle. For example, joysticks are used to pilot certain aircraft. The joystick is not portable and its lower end is connected to operating controls while the upper end has an ergonomically shaped handle. This handle can have buttons at various positions.

This joystick concept has been employed in video games where an erect handle is mounted to articulate through universal joint from a stationary base. In any event the device must detect angular displacement of the joystick in any direction. The handle of the joystick typically has pushbuttons at various positions, including the top of the joystick handle for facilitating thumb actuation. In some cases these video game controllers can signal a computer with an infrared transmitter. These devices however, are adapted for controlling video games and do not have switches arranged for controlling popular pieces of consumer electronics, such as televisions, video cassette recorders, or other equipment for handling video or audio signals. Because these devices are joysticks (or pointing devices), they cannot issue commands independently of the angular displacement of the joystick.

See U.S. Design Pat. Nos. D270,631; D298,749; D300,023; D318,496; D319,059; D322,609; D327,674; D327,882; D330,020; D340,042; D340,706; D347,028; and D349,491; and U.S. Utility Pat. No. 4,020,527; and 4,864,340.

Accordingly, there is a need for an ergonomic remote control that can be comfortably actuated by the thumb and other fingers of a hand to control various pieces of equipment that handle video or audio signals.

SUMMARY OF THE INVENTION

In accordance with the illustrative embodiments demonstrating features and advantages of the present invention, there is provided a remote control for issuing commands to equipment that handles a video or audio signal. The remote control has a bar having a central longitudinal axis and a head. The bar is sized to be manually gripped. A thumbswitch is mounted at the head of the bar in approximate alignment with the central longitudinal axis. Also included is a signalling means mounted on the bar for radiating a control signal to the equipment. The remote control also has a processing means coupled to the thumbswitch and the signalling means for commanding through the signalling means in response to a predetermined reciprocation of the thumbswitch an operational change in the equipment, which is unambiguously consummated without further manipulation of the remote control and independently of the angular orientation of the central longitudinal axis.

According to another aspect of the invention a remote control is provided for a television. The remote control has a bar having a central longitudinal axis, and a head. The bar is sized to be manually gripped. A thumbswitch in mounted at the head of the bar in alignment with the central longitudinal axis. Also, a signalling means mounted on the bar can transmit a control signal to the equipment. The remote control also has a processing means coupled to the thumbswitch and the signalling means for signalling the equipment through the signalling means to change channels in response to operation of the thumbswitch.

By employing apparatus of the forgoing type, an improved remote control is achieved. In a preferred embodiment a generally round or cylindrical bar has a number of transverse finger depressions for cradling four fingers (index, middle, ring, and small fingers). Each of the depressions contains a supplemental switch. The preferred supplemental switches have a transversely elongated, pushbutton surface that wraps partially around the perimeter of the bar.

The preferred bar is attached at an acute angle to an enlarged base containing a battery compartment. The base is arranged to allow the bar to rest on the base upright with its head up. The preferred head of the bar projects outwardly at an oblique angle and houses a preferred infrared transmitter. This angle allows for the proper projection of the signal to allow for proper reception, thereby eliminating the need to "point" the remote control. This reduces the chances of carpal tunnel syndrome during prolonged use.

The head is topped by a preferred thumbswitch having a neutral and four other positions. When controlling a television, the four positions can be used to change television channels as well as adjust audio volume. The thumbswitch is approximately aligned with the bar's longitudinal axis when the user's thumb need not stretch uncomfortably past the other fingers.

This preferred remote control can have various other switches. Preferably, the underside of the base has a numeric keypad for entering numbers that can signify, for example, a desired television channel.

BRIEF DESCRIPTION OF THE DRAWING

The above brief description as well as other objects, features, and advantages of the present invention will be more fully appreciated by reference to the following detailed description of presently preferred, but nonetheless, illustrative embodiments, when taken in conjunction with the accompanying drawings, wherein:

FIG. 4 is a front elevational view of the control of FIG. 1;

FIG. 5 is a right elevational view of the control of FIG. 1;

FIG. 7 is a bottom view of the control of FIG. 1; and

DETAILED DESCRIPTION OF THE PREFERRED EMBODIMENTS

Figure 1:
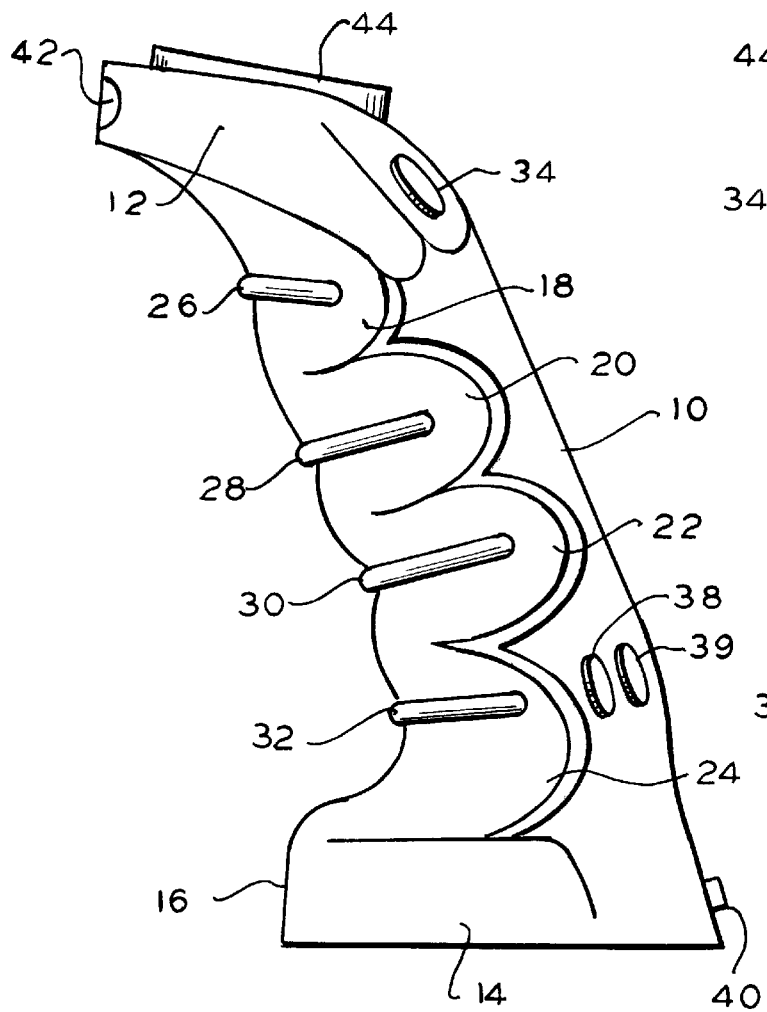
FIG. 1 is a left elevational view of remote control in accordance with the principles of the present invention.
Figure 2:
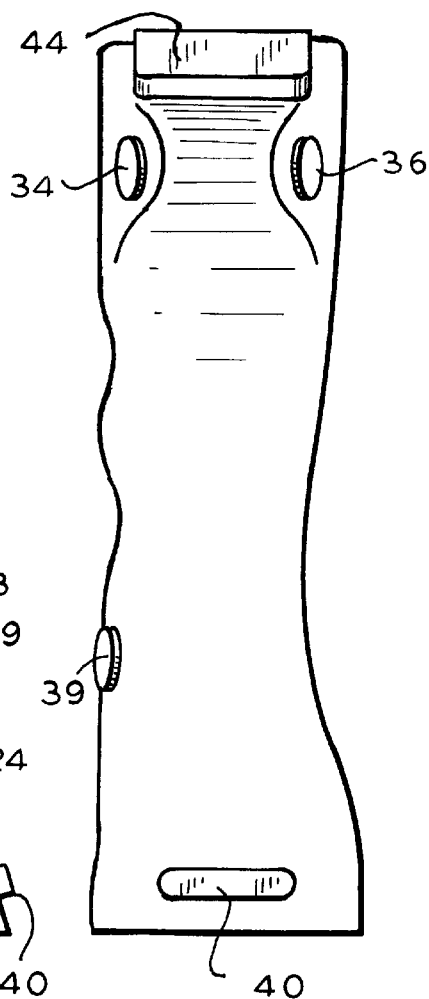
FIG. 2 is a rear elevational view of the control of FIG. 1.
Figure 3:
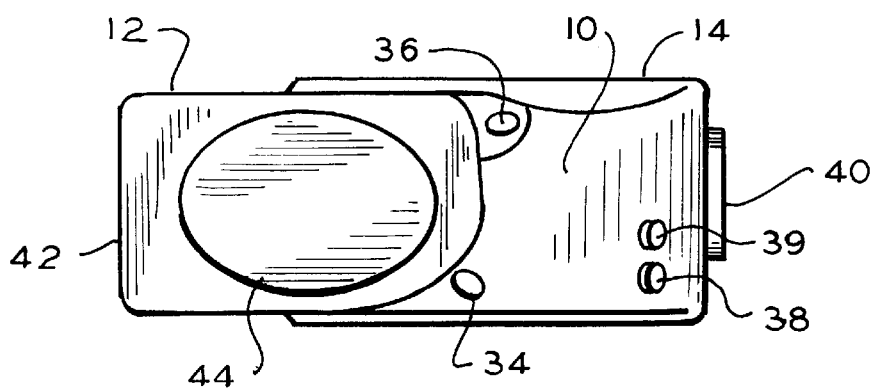
FIG. 3 is a top plan view of the control of FIG. 1.
Figure 6:
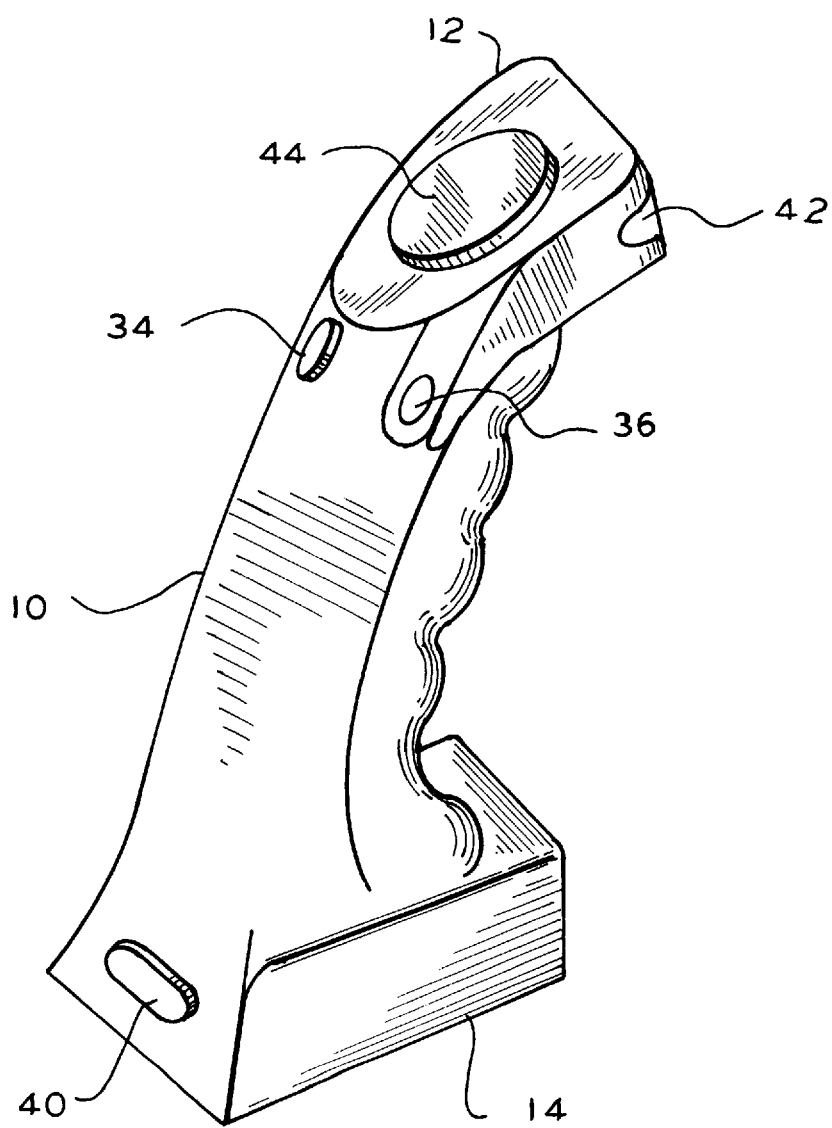
FIG. 6 is a right rear axonometric view of the control of FIG. 1.

Referring to FIGS. 1–6, a remote control is shown having a bar 10 with a generally cylindrical shape. Bar 10 is crested by a slab-like head 12, making an oblique angle with bar 10. The bottom of bar 10 connects at an acute angle to a base 14. The front of base 14 has a door 16 leading to a battery compartment. Bar 10 is preferably a molded plastic body, although other materials can be used instead.

Molded into the preferred bar 10 are four finger depressions 18, 20, 22, and 24. These depressions 18–24 wrap circumferentially around bar 10, traversing the front and left side of bar 10. Mounted in depressions 18, 20, 22, and 24 are supplemental switches 26, 28, 30 and 32, respectively. Switches 26–32 have elongated pushbutton surfaces that wrap around depressions 18–24 from the front to the left side thereof, as illustrated. As discussed further hereinafter, one of the supplemental switches 26–32, can be used as a select switch to automatically select a predetermined television channel, in a manner to be described presently.

Moreover, the supplemental finger switches need not have elongated pushbuttons but may employ buttons that are cylindrical, ovoid or have other shapes. In fact, the finger switches need not be pushbuttons, but could be pressure sensitive "touch" areas. Also, while four depressions are shown with four supplemental switches, in some embodiments a lesser (or greater) number may be employed instead. Furthermore, finger depressions can be molded having various shapes or may be eliminated in some embodiments. Also, while the illustrated device was designed for the right hand, left handed devices are contemplated as well.

Mounted on the back of head 12 are a spaced pair of head switches 34 and 36. Also mounted on the left side of bar 10, behind supplemental switch 32, are a pair of pushbutton switches 38 and 40. An enter key 42 is shown as a pushbutton 40 at the rear of base 14.

Mounted at the front edge of head 12 is a signalling means, shown as a window 42, behind which is mounted an infrared transmitter (illustrated schematically hereinafter as a light emitting diode).

Thumbswitch button 44 is mounted atop head 12 in alignment with the central longitudinal axis of bar 10 (since bar 10 is approximately cylindrical, the central axis is the approximate cylinder axis). Thumbswitch button 44 is illustrated in its neutral position, but also has four other positions: right, left, forward, and rear. In some embodiments, thumbswitch 44 can slide right, left, forward, and backward. Alternatively, the switch may be mounted on a universal joint to rock right, left, forward, and backward. Under these circumstances then, effectively four switches (illustrated further hereinafter) are arranged around the thumbswitch 44 to be individually actuated in response to the rocking or sliding motion of the pushbutton 44.

Also, while thumbswitch 44 is shown with four positions other than neutral, in some embodiments, two or a different number of positions may be used, depending on the desired complexity. Moreover, in some embodiments the thumbswitch may have still a fifth position, for example a vertical motion without lateral motion.

Referring to FIG. 7, a keypad is shown having five rocker switches 51-52, 53-54, 55-56, 57-58, and 59-60 mounted in a depression in the underside of base 14. Each of the five switches 51–60 are shown as elongated rocker switches that can be actuated by depressing either end of the rocker. Two digits are assigned to each of these rocker switches; for example, switch 51-52 has digits 1 and 2 assigned thereto. As an example, the number "14" can be signalled by depressing end 51 of rocker switch 51-52 and end 54 of rocker switch 53-54. In other embodiments the rocker switches can be replaced with ten individual pushbuttons arranged in a different pattern. The end of a digit sequence can be signified by depressing enter switch 40.

Figure 8:
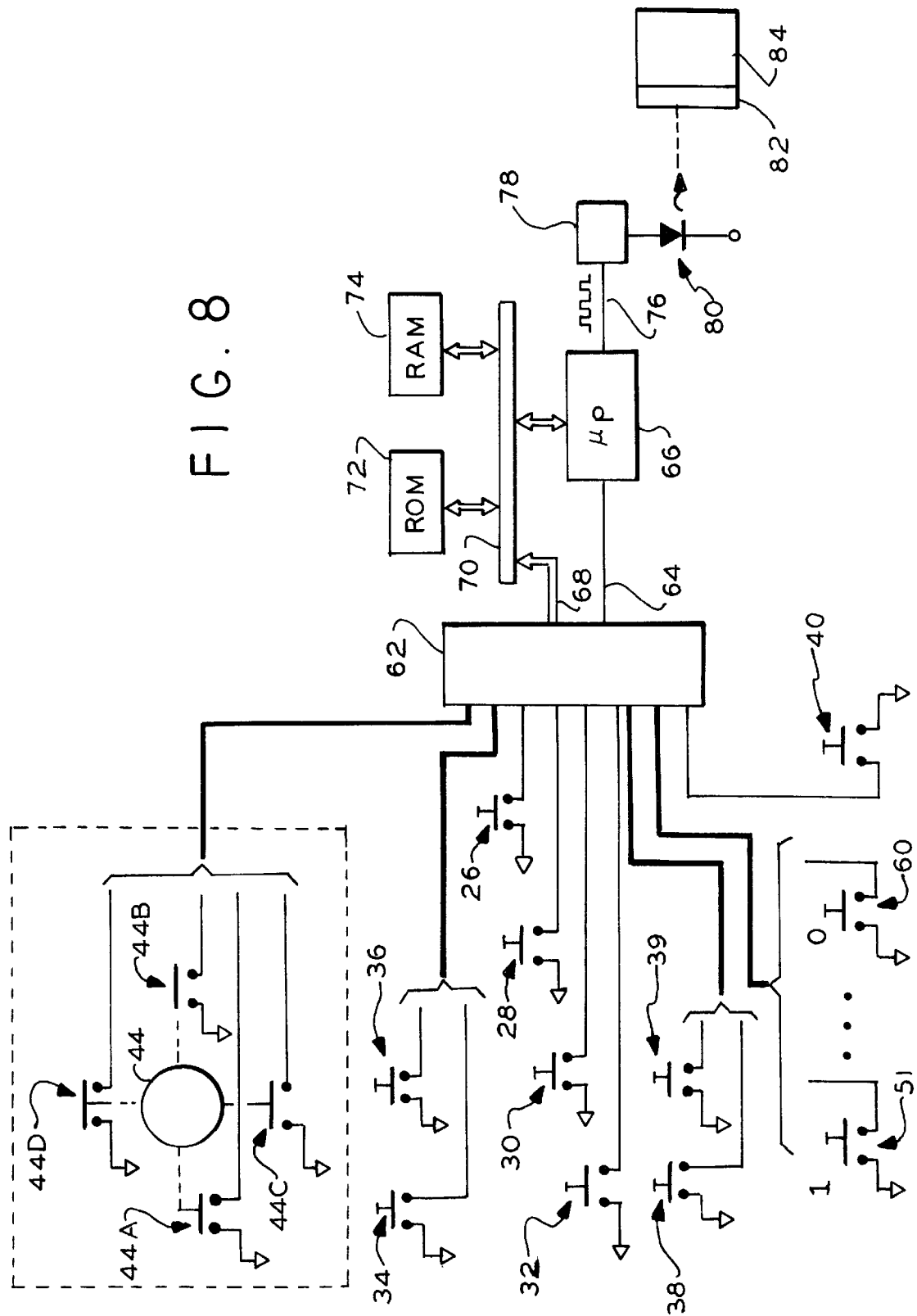
FIG. 8 is block schematic diagram of electronics contained within the control of FIG. 1.

Referring to FIG. 8, previously mentioned rocker switches 51–60 are partially shown in the lower left corner of the drawing, as schematically illustrated pushbutton switches 51–60 (constituting ten separate switches). Enter switch 40 is illustrated together with supplemental finger switches 26–32 and additional switches 34–39. Switches 26–40 and 51–60 are shown connected to encoder 62.

Previously mentioned thumbswitch button 44 is shown mechanically coupled to orthogonal switches 44A, 44B, 44C and 44D. Pushbutton 44 together with switches 44A–44D are collectively referred to as a thumbswitch. Switch 44A is actuated when thumbswitch button 44 is pressed forward while switch 44B is actuated when thumbswitch 44 is moved back. Switches 44C and 44D are actuated when thumbswitch button 44 is moved left and right, respectively. Each of the switches 44A–44D are connected to encoder 62.

Encoder 62 can be an input/output circuit that responds through combinational logic to the signals applied by the various switches illustrated to the left of decoder 62. For example, depression of one of the pushbutton switches can be encoded to a unique 5-bit signal, signifying the one switch being depressed. This 5-bit code can be stored in a latch (not shown) while an interrupt signal is forwarded along line 64 to a processing means, shown herein as microprocessor 66. Microprocessor 66 is shown also connected to bus 70.

Microprocessor 66 can be any one of several commercially available microprocessors, for example, an Intel microprocessor type 8086 will operate satisfactorily, although other integrated circuits may be substituted therefore. When microprocessor 66 issues a read command to encoder 62, the 5-bit signal is issued along output 68 to bus 70. Cooperating with microprocessor 66 are read only memory 72 and random access memory 74. Memory 72 can contain the program necessary to control the functions of microprocessor 66, while memory 74 can be working memory used by the microprocessor 66 during its run time.

Microprocessor 66 is programmed by memory 72 to respond to the operator commands issued along output 68.

Microprocessor 66 may be programmed and may produce pulse coded data in accordance with known technology; for example, the technology used in remote controls for television or other electronic devices.

In one embodiment, when an interrupt signal is recognized along line 64, microprocessor 66 fetches an encoded signal through bus 70 and determines its value. Once its value is determined, microprocessor 66 looks up in a table in memory 72 a data bit sequence corresponding to the output 68. The bit sequences stored in the table in memory 72 are essentially serial codes that can be assembled by microprocessor 66.

The serial code can be in the form of a unique start code (a series of pulses having a specific timing) followed by a series of pulses that are spaced to signify ones and zeroes. This pulse sequence can again be terminated by a unique sequence of pulses indicating the end of the code sequence.

Accordingly, microprocessor 66 will issue a pulse sequence defined by the instructions contained in the look-up table along line 76, which is coupled to driver 78. Driver 78 applies a pulsed, constant current having a pulsed waveform as suggested by line 76 to light emitting diode 80. Diode 80 is designed to transmit infrared light having the pulse waveform dictated by line 76. Light emitting diode 80 is positioned in head 12 (FIG. 1) behind window 42.

The infrared light from diode 80 is shown being received by infrared detector 82 mounted in equipment 84. Equipment 84 may be any one of a number of devices for handling video or audio signals. For example, equipment 84 may be a television, a video cassette recorder, a compact disc player, a stereo, or any one of a number of electronic equipment.

To facilitate an understand of the principles associated with the forgoing apparatus, its operation will be briefly described. The following assumes that the remote control is used to control a television (although similar remarks will apply when the control is used similar electronic devices). Accordingly, memory 72 has a table designed to produce a pulse sequence that will operate a television 84 (FIG. 8) as described later.

Thumbswitch 44 (FIG. 1) is programmed so that forward motion of the thumbswitch 44 increments the television channel, while rearward motion decrements the television channels. Also, thumbswitch 44 is programmed so that leftward motion decreases the television audio volume while rightward motion increases the audio volume. Pushbutton switch 34 is programmed as a mute switch to eliminate the television audio. Switch 38 is programmed to operate as a power switch for the television, while switch 39 is programmed as a power switch for the cable selector.

Specific television channels can be selected by using the keypad on the underside of base 14 (FIG. 7). For example, channel 52 can be selected by pressing switch end 55 and switch end 52 followed by depression of the enter key 40.

The operation of any switch can be altered by first pressing (or simultaneously pressing) function switch 36. For example, "function-8" (combination of switches 36 and 58) may be programmed to signify a contrast adjustment for the television picture.

Supplemental finger switches 26–32 can also be programmed to provide various functions. In fact, the operation of these switches can be altered by using the above mentioned function switch 36. Thus individual ones of the switches 26–32 can be programmed to select certain preset, favorite channels. Alternatively, certain of these switches can be programmed to establish a preset volume level; for example, a volume reduction during commercials. Still another one of the switches 26–32 can be programmed to scan through the television channels at a programmed speed.

Arranged in this fashion, the viewer can grasp bar 10 with the thumb comfortably poised over thumbswitch 44, and the four other fingers comfortably poised over the finger depressions 18–24. Thus the viewer can change channels and audio volume by simple thumb motions. Also without repositioning the finger, the several supplemental switches 26–32 can be used for various, frequently needed purposes, such as selecting favorite channels or adjusting volume in a preset manner, etc.

The above arrangement is highly convenient because, for the most part, the viewer can hold the controller with the same hand position, throughout most of the viewing session, executing most functions by simple motions of the thumb or the other four fingers. This eliminates the need to visually locate the appropriate key.

One exception occurs however, when the keypad on the underside of base 14 is used. Then, the user will invert the bar 10 to expose the keypad, holding the bar with one hand. The numeric keys can be depressed in the usual fashion with a finger of the other hand.

It is to be appreciated that various modifications may be implemented with respect to the above described preferred embodiments. For example, the length and thickness of the control body can be altered, depending upon the desired weight, number of switches, the pushbutton arrangement, the expected hand size, etc. Also while the bar is generally cylindrical, in other embodiments the cross section can be oval, polygonal, or have other shapes. Additionally, the number and arrangement of switches can be varied depending on ergonomic considerations or desired complexity. Also, the just described functions of the various switches can be changed depending upon the type of equipment being controlled. Additionally, the bar is shown with a forward projecting head and base section, either or both of which may be eliminated in some embodiments. In still other embodiments the head and base may be enlarged, reshaped, or canted at a different angle.

Obviously, many modifications and variations of the present invention are possible in light of the above teachings. It is therefore to be understood that within the scope of the appended claims, the invention may be practiced otherwise than as specifically described.

I claim:

1. A remote control for issuing commands to equipment that handles a video or audio signal, comprising:

a bar having a central longitudinal axis intersecting two opposite ends of said bar, said bar having a head at one of said opposite ends and being sized to be held by wrapping fingers about said bar and around said central longitudinal axis, said bar having opposite said head, a base having a keypad;

a thumbswitch mounted and oriented at the head of said bar to be substantially exposed to thumb fingering directed along said central longitudinal axis;

a signaling means mounted on said bar for radiating a control signal to said equipment for controlling said equipment wirelessly; and processing means coupled to said thumbswitch and said signaling means for commanding an operational change in said equipment through said signaling means in response to a predetermined reciprocation of said thumbswitch, said operational change in said equipment being unambiguously consummated without further manipulation of said remote control and independent of angular displacement of said central longitudinal axis.

2. A remote control according to claim 1 wherein said keypad underlies said base.

3. A remote control according to claim 1 wherein said keypad has a plurality of rocker switches each operable to signify one of a pair of numbers.

4. A remote control according to claim 3 wherein said keypad underlies said base.

5. A remote control according to claim 3 comprising:
an enter key mounted on said base, said keypad and said enter key being mounted on adjacent faces of said base.

6. A remote control according to claim 1 wherein said base makes an acute angle with said bar.

7. A remote control for issuing commands to equipment that handles a video or audio signal, comprising:
a bar having a central longitudinal axis intersecting two opposite ends of said bar, said bar having a head at one of said opposite ends and being sized to be held by wrapping fingers about said bar and around said central longitudinal axis;
a thumbswitch mounted and oriented at the head of said bar to be substantially exposed to thumb fingering directed along said central longitudinal axis;
a signaling means mounted on said bar for radiating a control signal to said equipment for controlling said equipment wirelessly;
processing means coupled to said thumbswitch and said signaling means for commanding an operational change in said equipment through said signaling means in response to a predetermined reciprocation of said thumbswitch, said operational change in said equipment being unambiguously consummated without further manipulation of said remote control and independent of angular displacement of said central longitudinal axis; and
a supplemental switch mounted on said bar and coupled to said processing means for signalling said equipment through said signalling means in response to operation of said supplemental switch to automatically scan successive television channels of said equipment.

8. A remote control according to claim 7 comprising:
a select switch mounted on said bar and coupled to said processing means for signalling said equipment through said signalling means in response to operation of said select switch to select a predetermined television channel of said equipment.

9. A remote control according to claim 6 comprising:
a select switch mounted on said bar and coupled to said processing means for signalling said equipment through said signalling means in response to operation of said select switch to identify predetermined television channel that are to skipped when a channel change is initiated by said thumbswitch.

10. A remote control for a television receiver comprising:
a bar having a central longitudinal axis intersecting two opposite ends of said bar, said bar having a head at one of said opposite ends and being sized to be held by wrapping fingers about said bar and around said central longitudinal axis;
a thumbswitch mounted and oriented at the head of said bar to be substantially exposed to thumb fingering directed along the central longitudinal axis;
a signaling means mounted on said bar for transmitting a control signal to said television for controlling said television wirelessly;
processing means coupled to said thumbswitch and said signaling means for signaling said television through said signaling means to change channels in response to the operation of said thumbswitch; and
a supplemental switch mounted on said bar and spaced from said head, said supplemental switch being positioned to allow single-handedly a thumb to be positioned at said thumbswitch while another finger is positioned to operate said supplemental switch;
wherein said bar has a depression for cradling a finger, said supplemental switch being mounted in said depression.

11. A remote control for a television receiver comprising:
a bar having a central longitudinal axis intersecting two opposite ends of said bar, said bar having a head at one of said opposite ends and being sized to be held by wrapping fingers about said bar and around said central longitudinal axis;
a thumbswitch mounted and oriented at the head of said bar to be substantially exposed to thumb fingering directed along the central longitudinal axis;
a signaling means mounted on said bar for transmitting a control signal to said television for controlling said television wirelessly;
processing means coupled to said thumbswitch and said signaling means for signaling said television through said signaling means to change channels in response to the operation of said thumbswitch; and
a plurality of supplemental switches mounted on said bar and spaced from said head, said supplemental switches being positioned to allow single-handedly a thumb to be positioned at said thumbswitch while other fingers are positioned to operate said supplemental switches,
said bar having a plurality of depressions for cradling fingers, said supplemental switches being separately mounted in said depressions.

12. A remote control for issuing commands to equipment that handles a video or audio signal, comprising:
a bar having a central longitudinal axis intersecting two opposite ends of said bar, said bar having a head at one of said opposite ends and being sized to be held by wrapping fingers about said bar and around said central longitudinal axis;
a thumbswitch mounted and oriented at the head of said bar to be substantially exposed to thumb fingering directed along said central longitudinal axis, said thumbswitch having at least three positions;.
a signaling means mounted on said bar for radiating a control signal to said equipment for controlling said equipment wirelessly; and
processing means is coupled to said thumbswitch and said signaling means for commanding an operational change in said equipment through said signaling means in response to a predetermined reciprocation of said thumbswitch, said operational change in said equipment being unambiguously consummated without further manipulation of said remote control and independent of angular displacement of said central longitudinal axis wherein said processing means is alternately operable to increment and decrement television channels of said equipment in response to actuation of said thumbswitch.

13. A remote control according to claim 12,
wherein said thumbswitch has a neutral position and four other discrete positions; and wherein said processing means being alternately operable to increase and decrease volume of said equipment in response to actuation of said thumbswitch.

14. A remote control according to claim 13, further comprising:

a plurality of supplemental switches mounted on said bar and spaced from said head, said supplemental switches being positioned to allow single-handedly a thumb to be positioned at said thumbswitch while other fingers are positioned to operate said supplemental switches, said bar having a plurality of adjacent depressions for cradling fingers, said supplemental switches being separately mounted in said depressions.

15. A remote control according to claim 14, wherein each of said supplemental switches is elongated and wraps at least partially around said bar.

16. A remote control according to claim 14, wherein said plurality of supplemental switches are four in number.

17. A remote control for issuing commands to equipment that handles a video or audio signal, comprising:

a bar having a central longitudinal axis intersecting two opposite ends of said bar, said bar having a head at one of said opposite ends and being sized to be held by wrapping fingers about said bar and around said central longitudinal axis wherein said bar has opposite said head a base having a keypad;

a thumbswitch mounted and oriented at the head of said bar to be substantially exposed to thumb fingering directed along said central longitudinal axis; said thumbswitch having at least three positions;

a signaling means mounted on said bar for radiating a control signal to said equipment for controlling said equipment wirelessly; and processing means is coupled to said thumbswitch and said signaling means for commanding an operational change in said equipment through said signaling means in response to a predetermined reciprocation of said thumbswitch, said operational change in said equipment being unambiguously consummated without further manipulation of said remote control and independent of angular displacement of said central longitudinal axis.

18. A remote control according to claims 17, wherein said keypad underlies said base.

19. A remote control according to claim 17, wherein said keypad has a plurality of rocker switches each operable to signify one of a pair of numbers.

20. A remote control according to claim 19, wherein said keypad underlies said base.

21. A remote control according to claim 17, comprising:

an enter key mounted on said base, said keypad and said enter key being mounted on adjacent faces of said base.

22. A remote control according to claim 17, wherein said base makes an acute angle with said bar.

23. A remote control according to claim 22, further comprising:

a select switch mounted on said bar and coupled to said processing means for signaling said equipment through said signaling means in response to operation of said select switch to select a predetermined television channel of said equipment.

24. A remote control according to claim 22, further comprising:

a select switch mounted on said bar and coupled to said processing means for signaling said equipment through said signaling means in response to operation of said select switch to identify predetermined television channel that are to be skipped when a channel change is initiated by said thumbswitch.

* * * * *